June 10, 1930.  J. H. GUY  1,762,864
EDUCATIONAL DEVICE
Filed Nov. 16, 1929    4 Sheets-Sheet 1
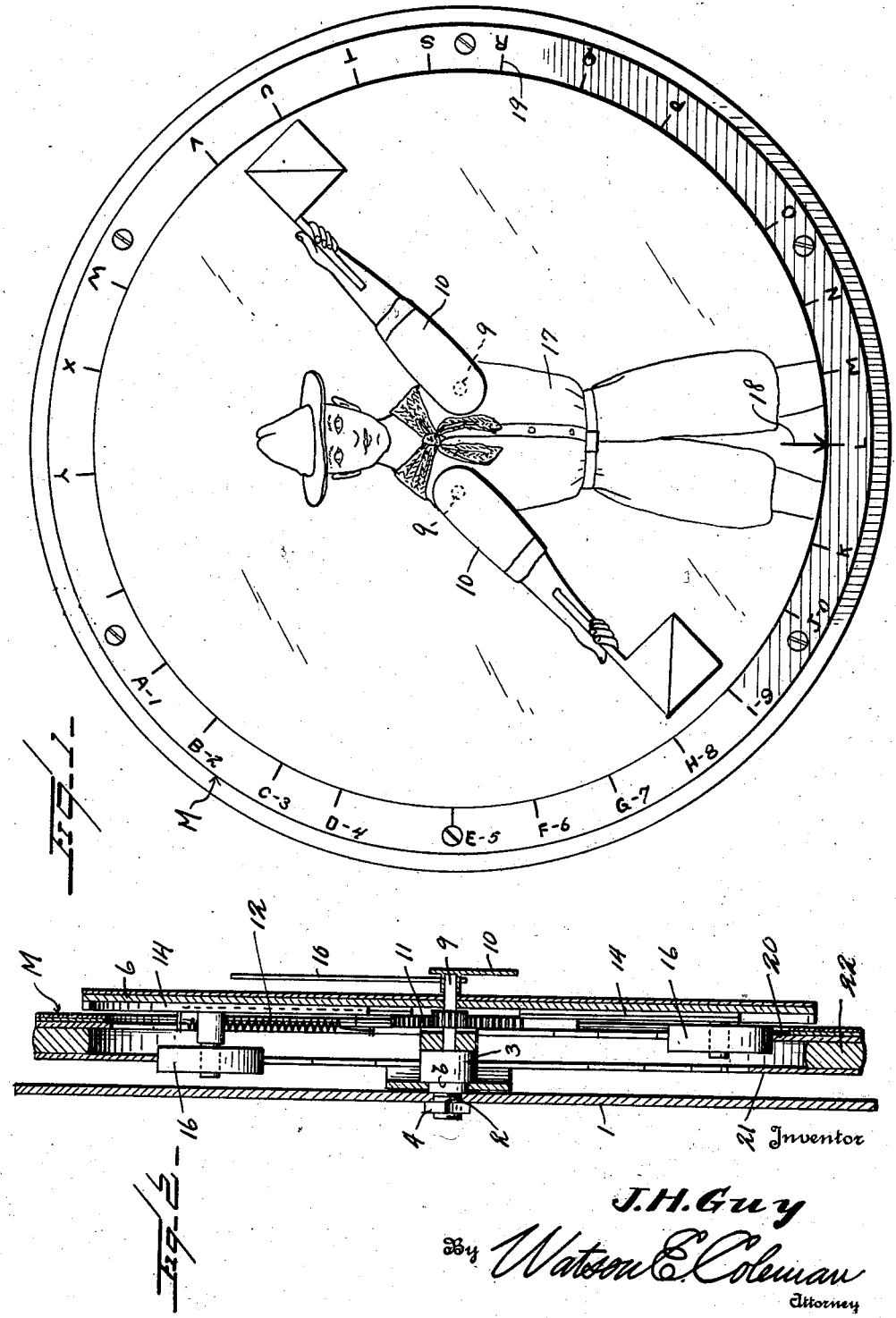

June 10, 1930.    J. H. GUY    1,762,864
EDUCATIONAL DEVICE
Filed Nov. 16, 1929    4 Sheets-Sheet 2
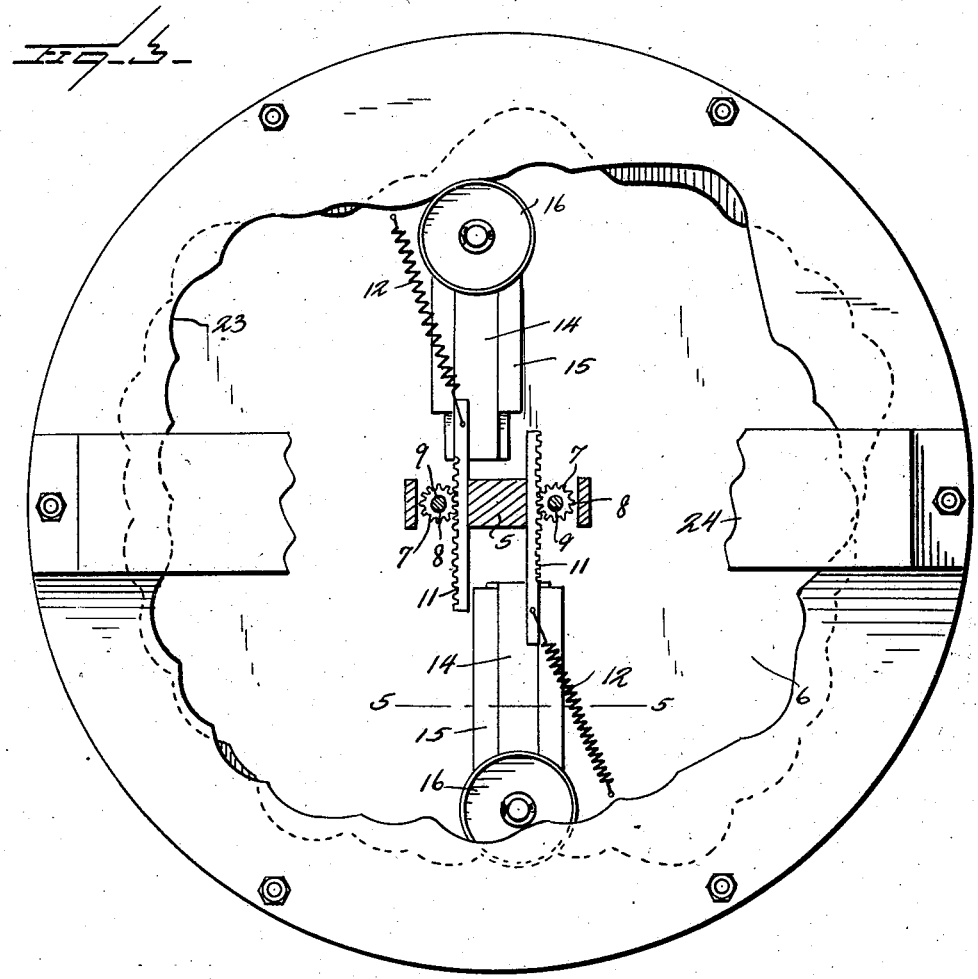
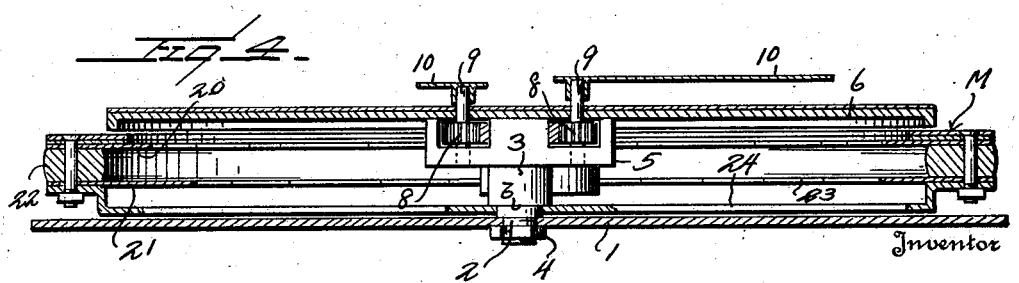

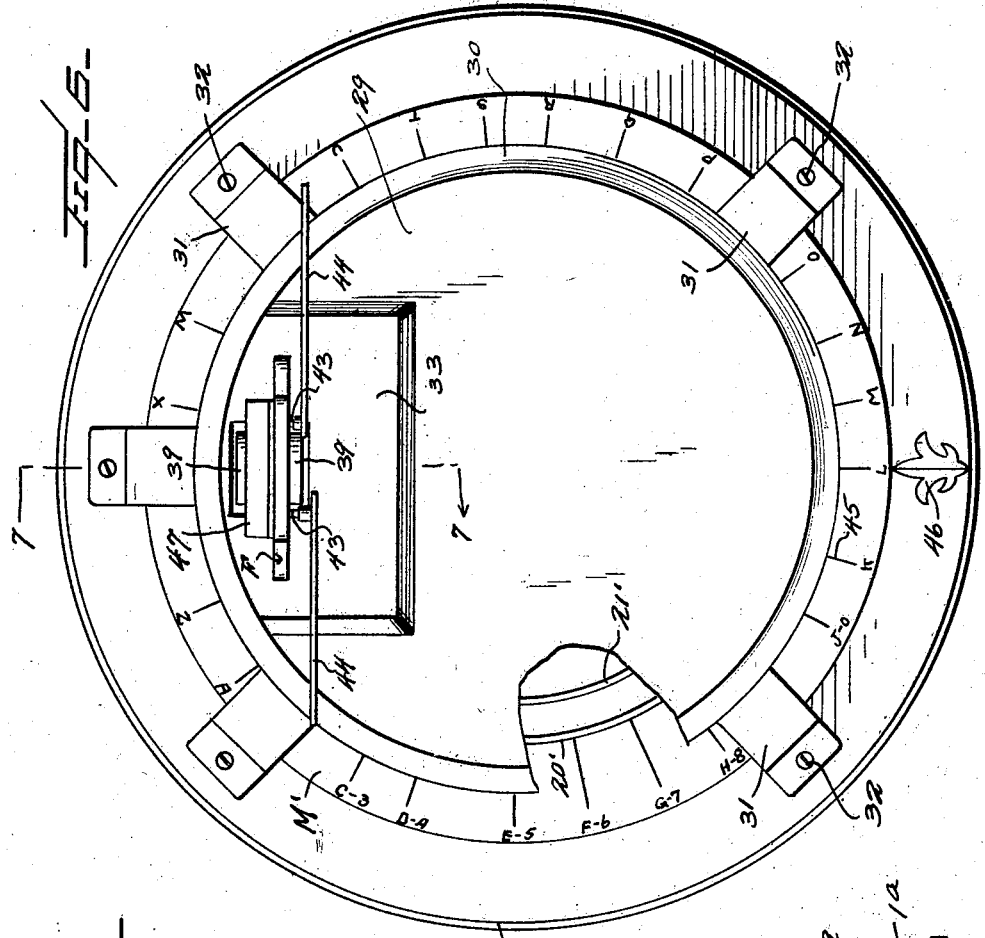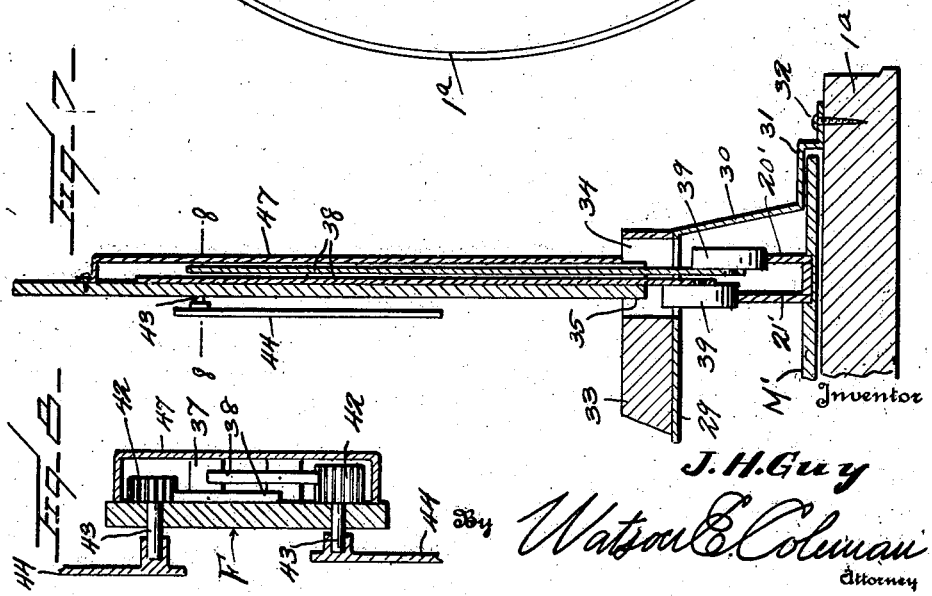

June 10, 1930.  J. H. GUY  1,762,864
EDUCATIONAL DEVICE
Filed Nov. 16, 1929  4 Sheets-Sheet 4
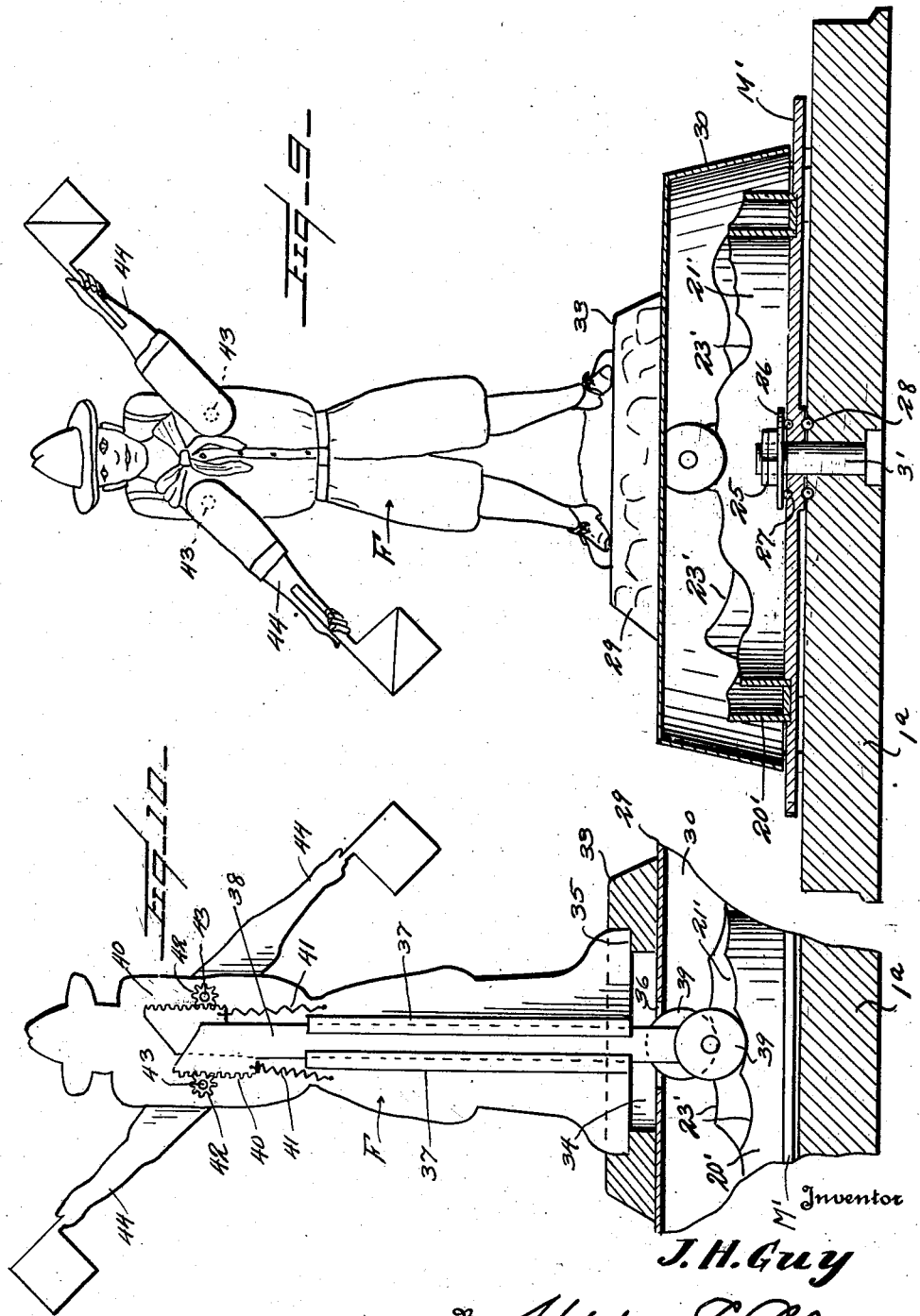
Inventor
J. H. Guy
By Watson E. Coleman
Attorney Patented June 10, 1930

1,762,864

UNITED STATES PATENT OFFICE

JOHN H. GUY, OF RICHMOND, VIRGINIA

EDUCATIONAL DEVICE

Application filed November 16, 1929. Serial No. 407,695.

This invention relates to an educational device and primarily it is an object of the invention to provide a device of this kind especially designed and adapted for use in giving instructions in connection with semaphore signals.

It is also an object of the invention to provide a device of this kind comprising relatively movable members coacting with semaphores to cause said semaphores, upon relative movement of the members, to assume automatically predetermined positions in accordance with the instructions desired to be given.

The invention consists in the details of construction and in the combination and arrangement of the several parts of my improved educational device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view of a device constructed in accordance with an embodiment of my invention;

Figure 2 is a sectional view taken radially through Figure 1 with certain of the parts in elevation;

Figure 3 is a view in rear elevation of the structure as illustrated in Figure 1 with certain of the parts broken away and the rear plate omitted;

Figure 4 is a sectional view taken radially through Figure 1 on a line substantially at right angles to the line of section of Figure 2;

Figure 5 is a detailed sectional view taken substantially on the line 5—5 of Figure 3;

Figure 6 is a view in top plan with portions broken away of an educational device constructed in accordance with a further embodiment of my invention;

Figure 7 is a sectional view taken substantially on the line 7—7 of Figure 6;

Figure 8 is a sectional view taken substantially on the line 8—8 of Figure 7;

Figure 9 is a view partly in front elevation and partly in section of the device constructed in accordance with this second embodiment of my invention;

Figure 10 is a view partly in rear elevation and partly in section of the structure as illustrated in Figure 9.

As disclosed in the accompanying drawings, 1 denotes a base member or disc of desired dimensions and which has extending through its axial center a threaded shank 2. The shank 2, as herein disclosed, constitutes a reduced extension carried by the outer stepped end portion of a post 3, said stepped portion providing the shoulders $a$ and $b$. The shoulder $a$ has direct contact with the inner fact of the plate or disc 1 to assure firm connection between the post 3 and the base plate 1 upon proper application of a holding nut 4.

The post 3 extends from the central portion of a bridge piece 5 secured to the rear fact of the dial plate 6. The bridge piece 5 is relatively short in length and disposed radially of the dial plate 6 and extends substantially an equal distance beyond the axial center of said plate 6, thus assuring the post 3 and the shank 2 being at the axial center of the plate 6 as said post 3 and shank 2 are located midway the ends of the bridge piece 5. The bridge piece 5 at points equi-distantly spaced from its longitudinal center and in the portion thereof immediately adjacent to the plate 6 is provided transversely therethrough with the openings or recesses 7 in which are positioned the pinions 8. These pinions 8 are fixed to the shafts 9, each of which having one end portion rotatably supported by the bridge piece 5 proper and having its opposite end portion rotatably supported by the dial plate 6 and extending forwardly therebeyond a desired distance. The extended portions of the shafts 9 constitute mountings for the semaphores 10.

As herein disclosed, the semaphores 10 are in simulation of the arms of a boy scout having the hand portions grasping the signal flags. Slidably disposed through the recesses or openings 7 in the bridge piece 5 are the elongated straight rack bars 11 in proper mesh with the pinions 8 to assure desired rotation of the shafts 9 upon endwise movement of the rack bars 11. In the present embodiment of my invention each of the rack bars 11 has engaged therewith a retractile coil spring 12 which in turn is suitably anchored to the dial plate 6, said spring serving to constantly urge its associated rack bar 11 outwardly.

The outer end portion of each of the rack bars 11 is anchored to an elongated sliding plate 14 supported for endwise movement by the parallel trackways 15 secured to the inner face of the plate 6. The outer extremity of the plate 14 carries a roller 16 rotating about an axis substantially at right angles to the plate 6, the positioning of the roller 16 is such as to have a portion thereof extending a desired distance beyond the outer end of the associated plate 14.

The outer face of the dial plate 6 has properly positioned thereon in the present embodiment of my invention a figure 17 in the general simulation of a boy scout with the shafts 9 so positioned with respect to the figure 17 to cause the semaphores 10 to closely imitate the general arm movements in the transmitting of semaphore signals under the standard code.

A peripheral portion of the outer face of the dial plate 6 at a predetermined point thereon is provided with an index or pointer 18 for coaction with the indications 19 carried by the actuating member M. This actuating member M and the dial plate 6 are arranged for relative rotation about a common axis so that the index or pointer 18 and the indications 19 may be selectively brought into desired register.

As herein disclosed, the actuating member M comprises two overlying annular plates 20 and 21 having interposed between and secured to their peripheral portions an annular spacer member 22. The inner marginal portions of the members 20 and 21 terminate inwardly of the spacer member 22, and the inner marginal edges of said members 20 and 21 constitute track edges.

The mounting and arrangement of the rollers 16 hereinbefore referred to is such that one of said rollers is maintained constantly in contact by the associated spring 12 with the internal track edge of the plate 20, while the second roller is similarly maintained constantly in contact with the track edge of the plate 21. The inner track edge of each of the plates 20 and 21 is formed with a plurality of successive depressions or pockets 23, each of which being of a depth to regulate and determine the positioning of an associated roller 16 with respect to the axial center of the plate 6. The extent of variance in the positioning of each of the rollers 16 with respect to the axial center of the plate 6 also determines the extent of rotation of a shaft 9 in either direction to bring the semaphore or arm 10 carried by such shaft 9 in a predetermined position in accordance with the instructions desired to be given.

The indications 19 are placed upon the outer face of the actuating member M in accordance with the various positions desired of the semaphores or arms 10 and for which reason said indications 19 are irregularly spaced due to the fact that the location of such indications 19 is dependent upon the depth of the depressions or pockets 23.

The indications 19, as illustrated in Figure 1, constitute in succession the letters of the alphabet and certain of such indications denote in desired sequence the numerals "1" to "9" and "0".

Disposed radially of the inner or rear plate 21 and anchored thereto at substantially diametrically opposed points is a mounting strip 24.

The central portion of this strip 24 is mounted upon the post 3 for contact with the shoulder $b$ resulting in a mounting whereby may be obtained the desired relation rotation of the member M and the plate 6 one with respect to the other. It is to be noted that the member M is of a diameter in excess of the diameter of the plate 6 so that the periphery of said member M may be readily engaged by the fingers of the hand grasping the plate 1 to impart desired rotation to the member M with respect to the plate 6. If preferred, the peripheral edge of the member M, or more particularly the spacer member 22, is roughened to facilitate such engagement.

It is also to be noted that the plate 1 is of a diameter greater than that of the member M so that the marginal portion thereof may be readily grasped by the hands in a manner to permit the thumbs to be used in revolving the member M. It is also to be stated that the plates 1 and 6 are non-rotatable one with respect to the other.

In the embodiment of my invention as illustrated in Figures 6 to 10 inclusive, the base member 1ª has disposed over its upper face an actuating member M' which rotates around an upstanding post 3' herein disclosed as disposed from below up through the base member 1ª and having threaded thereupon above the member M' a holding nut 25 particularly illustrated in Figure 9. Interposed between the nut 25 and member M' is a washer 26. Coacting with this washer 26 and the member M' are suitable anti-friction members 27.

It is also desirable to interpose between the central portion of the member M' and the base member 1ª suitable anti-friction members 28 so that the member M' may be rotated with respect to the base member 1ª with a minimum of frictional resistance.

Overlying the actuating member M' is a housing 29, the bottom face of which being open. The lower marginal portion of the side wall 30 of the housing 29 at desired points therearound is provided with the outstanding feet 31 which are anchored, as at 32, by screws or the like to the base member 1ª at points outwardly of the actuating member M'. As clearly indicated in Figure 7, each of the feet 31 has its outer portion properly offset to permit the anchoring of such feet without offering hinderance or obstruction to the desired rotation of the actuating member M'. It is also to be noted that the actuating member M' is of a diameter in excess of the major diameter of the housing 29 so that the marginal portion of the M' is not hidden or obsurced. The actuating member M' within the housing 29 is provided with the upstanding concentric annular plates 20' and 21', the upper free edges of which constituting track edges for a purpose to be hereinafter referred to.

Mounted upon the top wall of the housing 29 is a block 33 preferably in imitation of a rock. Disposed through this block is an opening 34 and in communication with this opening 34 at the opposite ends thereof are the slots 35 formed in the upper surface of the block 33. The opening 34 of the block 33 is continued by an opening 36 provided in the top wall of the housing 29.

The slots 35 are adapted to snugly receive the lower or base end portion of an elongated figure member F, herein disclosed as in simulation of a boy scout although it is to be understood that it may be imitative of any figure desired. This fitting of the lower or base portion of the figure member F within the slots 35 maintains said figure member in desired assembly with respect to the base member 1ª yet permits the same to be readily removed when desired.

The back of the figure member F is provided at its lower portion with the spaced trackways 37 extending lengthwise of the figure member F. Working between these trackways 37 are the elongated members 38. The lower end portions of the members 38 carry the rollers 39 while the opposite ends thereof are provided with the racks 40. As is particularly illustrated in Figure 10, it is to be noted that the rack 40 of one of the members 38 is oppositely disposed with respect to the rack 40 of the second member 38. Each of the members 38 is constantly urged in a direction towards the lower or base end portion of the figure member F by a retractile coil spring 41.

When the figure member F is mounted upon the block 33, the lower end portions of the members 38 together with the rollers 39 will extend within the housing 29 through the openings 34 and 36 with the rollers 39 directly above the annular plates 20' and 21'. These rollers are maintained constantly in contact with the upper or track edges of these plates by the springs 41.

The racks 40 constantly mesh with the pinions 42 fixed to the shafts 43. The shafts 43 extend forwardly of the figure member F at what may be termed the "shoulder portions" thereof and fixed to these extended portions of the shafts 43 are the semaphores 44.

The semaphores 44 are also in simulation of the arms of a boy scout having the hand portions grasping signal flags.

The upper marginal portions of the plates 20' and 21' are each formed with a plurality of successive depressions or pockets 23', each of which being of a depth to regulate or determine the positioning of an associated roller 39 with respect to the shaft 43. As is believed to be obvious, the extent of variance in the positioning of each of the rollers 39 determines the extent of rotation of the shafts 43 in either direction to bring the semaphores or arms 44 to the positions desired in accordance with the instructions being given.

The peripheral portion of the member M', or that portion disposed beyond or outwardly of the housing 29, has arranged circumferentially therearound the indications 45 constituting in succession the letters of the alphabet together with certain of such indications denoting in desired sequence the numerals "1" to "9" and "0".

The base member 1ª at a desired point thereon and outwardly of the member M' is provided on its upper surface with the index or pointer 46 for coaction with the indications 45.

The indications 45 are also irregularly placed due to the fact that the location of each of such indications is dependent upon the depth of the associated depression or pocket 23'.

As illustrated in Figures 6, 7 and 8, the members 38 and the parts directly associated therewith upon the figure member F are confined within a casing 47.

From the foregoing description it is thought to be obvious that an educational device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An appliance of the class described comprising two members supported for relative rotation, rockable semaphores carried by one of the members, the second member having trackways, said trackways having depressions therealong, a longitudinally movable operating member operatively connected with each of the semaphores for independently rocking each semaphore upon longitudinal movement of said operating member, and means for constantly maintaining said operating member in operative contact with a trackway, the depressions in the trackways upon relative rotation of the first two members adjusting the positions of the semaphores.

2. An appliance of the class described comprising two members supported for relative rotation, rockable semaphores carried by one of the members, the second member having trackways, said trackways having depressions therealong, a longitudinally movable operating member operatively connected with each of the semaphores for independently rocking each semaphore upon longitudinal movement of said operating member, and means for constantly maintaining said operating member in operative contact with a trackway, the depressions in the trackways upon relative rotation of the first two members adjusting the positions of the semaphores, one of said first named members being provided with indications associated with the depressions in the trackways to permit a selective adjustment of the semaphores.

3. An appliance of the class described comprising two members one being movable with respect to the other, trackways carried by the movable member, said trackways being provided with depressions of irregular depths, shafts rotatably carried by the second member, semaphores engaged with the shafts for movement therewith, elongated members supported by the second member for independent longitudinal movement, means for constantly maintaining said last named members in operative contact with the trackways, and a driven connection between the shafts and the last named members, one of said first named members being provided with indications coacting with the depressions in the trackways to determine the desired movements of the semaphores upon movement of one of the first named members with respect to the other.

4. An appliance of the class described comprising two members one movable with respect to the other, a trackway carried by one of the members and provided with irregular depressions, a rockable semaphore carried by the second member, and operating means coacting with the semaphore and the depressions in the trackway for swinging the semaphore into different positions upon relative movements of the members.

In testimony whereof I hereunto affix my signature.

JOHN H. GUY.